Figure 1:
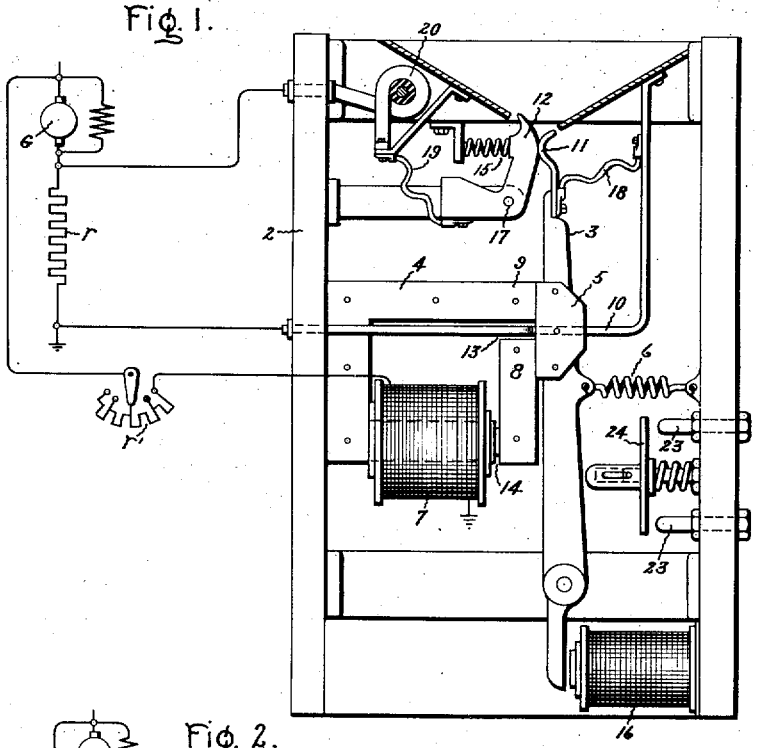

J. F. TRITLE.

CIRCUIT INTERRUPTER.

APPLICATION FILED JULY 11, 1921.

Reissued Aug. 29, 1922. 15,441.

Inventor:
John F. Tritle,
by Albert G. Davis
His Attorney.

UNITED STATES PATENT OFFICE.

JOHN F. TRITLE, OF SCHENECTADY, NEW YORK, ASSIGNOR TO GENERAL ELECTRIC COMPANY, A CORPORATION OF NEW YORK.

CIRCUIT INTERRUPTER.

15,441. Specification of Reissued Letters Patent. Reissued Aug. 29, 1922.

Original No. 1,323,798, dated December 2, 1919, Serial No. 214,805, filed February 1, 1918. Application for reissue filed July 11, 1921. Serial No. 483,955.

*To all whom it may concern:*

Be it known that I, JOHN F. TRITLE, a citizen of the United States, residing at Schenectady, county of Schenectady, State of New York, have invented certain new and useful Improvements in Circuit Interrupters, of which the following is a specification.

My invention relates to electric switches and it has for its principal object the provision of improved means whereby electric circuits may be quickly interrupted. More specifically, my invention relates to an improved interrupter which will positively and quickly interrupt an electric circuit in response to a predetermined condition; such, for instance, as an overload on the circuit.

My invention is applicable generally where an electric circuit must be quickly interrupted although it has a particular utility in the protection of dynamo-electric machines from excessive rushes of current occasioned by abnormal conditions in the electric circuits in which the dynamo-electric machines are included. In the case of direct current machines, such excessive rushes of current are apt to cause flash-overs at the commutators as well as damage the insulation of the machines. Excessive rushes of current, such as are caused by short circuits on the electric circuits supplied with energy from the dynamo-electric machines operating as generators, are particularly damaging, and since an exceedingly high current value is attained in a very short space of time after the establishment of the short circuit, the circuit interrupter must be very quick in its action otherwise the machine will be damaged before the interrupter can operate. Such extreme conditions preclude the use of the ordinary type of circuit breaker in which the movable switch contact member is held in its closed position against its bias to the open position by means of latches, triggers, and the like, because such devices introduce prohibitive delays in the operation of the interrupter.

It has heretofore been proposed to construct interrupters without triggers, latches, and the like and to maintain the movable switch member closed by means of an electromagnet having shunt and series coils differentially wound, the shunt coil normally maintaining the switch member in the closed position and the series coil acting in opposition so as to open the circuit in response to an overload. As ordinarily constructed, such interrupters have the great disadvantage that when there is a sudden heavy rush of current, such as a short circuit, a transformer effect is set up between the shunt and series coils so as to actually maintain the interrupter closed for an appreciable and dangerous length of time. One of the objects of my invention is to eliminate this objectionable feature and in carrying my invention into effect I provide a holding magnet having a shunt coil and dispose the current-responsive means in such a manner that there is substantially no inductive effect produced in the shunt coil due to a sudden change in current value, such as a short circuit. Although the means responsive to the current may be a coil or the like, in the preferred form of my invention it is a conductor which is straight throughout its effective portion. This conductor is so disposed that the armature of the electromagnet which holds the switch member in the closed position is demagnetized without appreciably reducing or otherwise affecting the flux in main portion of the magnetic circuit of the electromagnet, the conductor acting to merely change the path of the flux by deflecting it through a shunt around the armature in response to a predetermined value of current. The armature is thus demagnetized without materially changing in value the total flux set up by the shunt winding; that is, the flux through the armature set up by the shunt winding is neutralized but the flux density in the main portion of the magnetic circuit of the electromagnet remains substantially constant. In order to make the interrupter more quickly responsive to a sudden change in current value, in one form of my invention I provide an inductive shunt around the conductor so that the current in the conductor will increase at a greater rate than the rate of increase in the circuit controlled by the interrupter.

In order to preserve a good electrical contact surface between the switch contact elements, it is desirable to provide wiping contacts, but the ordinary form of such wiping contacts having the yieldingly mounted contact on the movable switch member which is biased to the open position would defeat the purpose of this invention in certain of its applications, because the yieldingly mounted contact would leave the stationary contact an appreciable interval of time after the switch member carrying this yieldingly mounted contact had begun to move. One of the objects of my invention is to provide improved wiping contacts which will retain all the advantages of such contacts, but nevertheless permit the interruption of the circuit as soon as the switch member begins to move. I accomplish this object by providing my interrupter with two movable contact members having different moments of inertia, the switch member which is normally biased to the open position being relatively quite light and the other switch contact being relatively quite heavy, yieldingly mounted and biased toward the light contact so as to give a wiping action to the contacts in closing. When the interrupter opens in response to abnormal conditions, the light switch member will immediately break engagement with the heavier contact in accordance with its bias and be accelerated rapidly because of its small moment of inertia, but the heavier contact will not immediately follow the light contact because of its greater moment of inertia. Speed in interruption as well as wiping action in closing are thus secured. In a divisional application, Serial No. 293,117, filed April 28, 1919, this particular feature of my invention is claimed specifically.

The novel features which I believe to be characteristic of my invention will be definitely indicated in the claims appended hereto; the features of construction, the mode of operation, and further objects of my invention will be readily understood from a consideration of the following description taken in connection with the accompanying drawings wherein I have shown embodiments of my invention.

Figure 2:
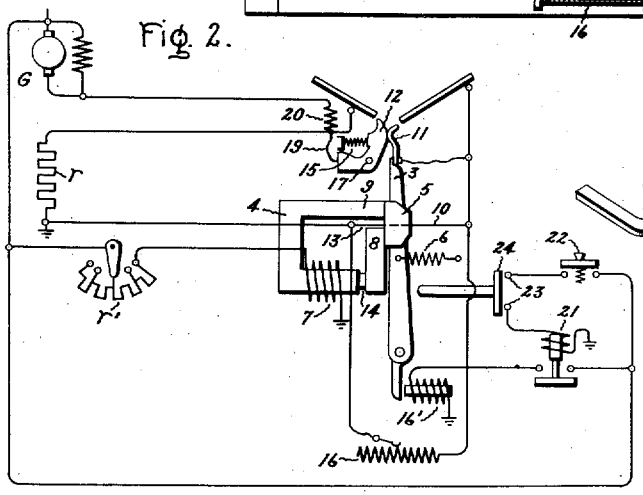
Figure 3:
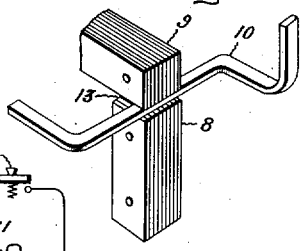

Referring to the drawings, Figure 1 shows one form of my invention in elevation and diagrammatic connections whereby the interrupter will protect a dynamo-electric machine from flash-over at the commutator; Fig. 2 is a simplified diagram somewhat similar to Fig. 1, illustrating the feature of an inductive shunt around the current-responsive means, and Fig. 3 is a detail elevation of a part of my interrupter showing the manner in which the conductor for effecting a demagnetization of the armature of the electromagnet is disposed in the magnetic circuit of the electromagnet.

Referring to Fig. 1 the generator G is protected from flash-over at the commutator by means of the interrupter 2 which is adapted to open its switch contacts in response to a predetermined current value and insert the resistance $r$ in the generator circuit so as to very quickly reduce the current from the generator. The quick action interrupter 2 is shown in the closed position and the switch contact member 3 is held against its bias to the open position by reason of the attraction of the electromagnet 4 for the armature 5. This movable switch member 3 is comparatively quite light so as to have a small moment of inertia and thus permit of being opened very quickly by the heavy spring 6 which moves the switch member to the open position in response to a predetermined value of current through the switch-contacts. The shunt coil 7 is provided for setting up a substantially constant flux in the holding electromagnet 4. This winding 7 may be energized from any suitable constant potential source and as shown in the drawing it is energized from the generator G. The armature 5 is adapted to bridge the pole pieces 8 and 9 of the electromagnet and be held there against the bias of the spring 6 until this armature is demagnetized by the conductor 10 which is in series with the switch contacts 11 and 12 and thus responsive to the current through those contacts. The conductor 10 is disposed in the air gap 13 which separates the poles 8 and 9 of the electromagnet, and the arrangement is such that this conductor is remotely disposed from the winding 7 of the electromagnet and adjacent to the armature 5. The direction of the magnetic flux set up by the conductor 10 is such that when the current through the switch contacts reaches a predetermined value, the path of the flux set up by the shunt winding 7 of the electromagnet is changed and is deflected to the left of the conductor through the air gap 13. In other words, the flux of the electromagnet is crowded to the left through this shunt path around the armature 5, the total flux set up by the electromagnet remaining substantially unchanged in value, thus substantially demagnetizing the armature 5 and permitting the switch member 3 to be moved quickly to the open position in accordance with the bias exerted by the spring 6. It will be readily understood by those skilled in the art that the rapidly increasing flux set up by the conductor 10 upon the occurrence of an overload, such as a short circuit for example, will produce a momentary condition in which the magnetic flux through the armature 5 will either be entirely suppressed or be so small that it will be insufficient to maintain the switch member 3 in the closed position against the strong pull of the spring 6. Because of the position of the conductor 10 and the arrangement of the parts as shown, there is substantially no inductive effect between this conductor and the winding 7, the conductor 10 merely acting to change the path of the flux set up by the winding 7 without effecting any substantial change in value in the total flux set up by this winding. In order to further insure that there shall be no inductive effect between the conductor 10 and the winding 7, and to insure that the armature will always drop out at the same point, the air gap 14 is provided in the magnetic circuit between the conductor and the winding. Furthermore, the close proximity of the conductor 10 to the armature 5 will produce the maximum effect in demagnetizing the armature in response to the predetermined condition. By making the conductor 10 as straight as possible it has very little inductive effect and is thus more effective in its action of deflecting the flux of the electromagnet. Calibration of winding 7 is effected by means of rheostat $r'$.

The contact 11 is made as light as possible consistent with the current required to be carried, and in fact, all of the parts of the switch member 3 are made as light as possible so that this switch member will have the smallest practicable moment of inertia to permit of a very quick acceleration in interrupting the circuit through the switch contacts. The movable contact 12, pivotally mounted on a stationary part of the interrupter is purposely made quite heavy so as to have a substantially greater moment of inertia than the switch member 3. This contact 12 is biased toward the contact 11 by means of the spring 15, thereby giving a wiping action to the contacts in closing. This arrangement of wiping switch contact members having different moments of inertia is claimed specifically in my divisional application, Serial No. 293,117, filed April 28, 1919.

Referring to Fig. 2, the inductive shunt 16 around the conductor 10 is provided for accelerating the increase in current in the conductor when the current through the switch contacts is increased very quickly, such as happens when a short circuit occurs. When the increase of current through the switch contacts occurs very slowly, the current in the conductor 10 and the inductive shunt 16 will increase in a substantially constant ratio, but when this increase occurs very rapidly the increase of current in the conductor 10 will occur far more rapidly than in the shunt 16 and the circuit controlled by the interrupter because of the inductive character of this shunt. This shunt is made adjustable so as to predetermine the current value and the ratio of increase in the current at which it is desired that the interrupter shall operate.

As thus constructed and arranged, the operation of my invention is as follows: Referring to Figs. 1 and 2, the switch member 3 will be moved to the closed position, that shown in Fig. 1, by hand or by the pull of the magnet 16'. In closing, the contact 11 will engage the heavy movable contact 12 and cause it to turn on its pivot 17 against the bias of the spring 15, thereby giving a wiping action to the contacts. When the contacts close, the resistance $r$ in the generator circuit is short circuited through a circuit including the conductor 10, flexible shunt 18, contacts 11 and 12, flexible shunt 19, and magnetic blowout coil 20. The armature 5 secured to the switch member 3 will bridge the air gap 13 between the poles 8 and 9 of the electromagnet 4 and the switch member 3 will be held in this closed position against the bias of the spring 6 by reason of the magnetic attraction set up by the flux produced by the shunt winding 7 of the electromagnet. Although substantially the full generator current is flowing through the conductor 10, provided the current is not in excess of the predetermined limit, the flux set up by the winding 7 will not be affected so as to diminish the pull of the electromagnet below that required to hold the armature 5 in the closed position. It will be understood that in the arrangement shown, the poles 8 and 9 of the electromagnet will be north and south poles respectively and that the magnetic whirl or flux set up by the conductor 10 will cause a crowding of the lines of force through the air gap 13 to the left of the conductor 10 and away from the armature 5. When a short circuit or any overload occurs, the crowding effect will be so great that the path of substantially the entire flux set up by the winding 7 will be changed and will be deflected from the armature 5 through a shunt path including the air gap 13, the total flux of the electromagnet nevertheless remaining substantially constant in value. When the armature 5 is thus momentarily substantially demagnetized, the spring 6 will cause the switch member 3 to immediately break the engagement of the contacts 11 and 12 and thus quickly interrupt the circuit. The switch member 3 will be accelerated very rapidly because of having a very small inertia effect, but the contact 12 having a substantially greater inertia effect will not immediately follow the contact 11, even though it is biased toward the contact 11 by the spring 15. A very speedy interruption of the circuit is thus produced and the resistance 3 inserted in the generator circuit before a flash-over can occur at the commutator. The magnetic blow-out 20 operates to quickly disrupt any arc that may tend to be formed at the contacts 11 and 12 in a manner well understood by those skilled in the art. With my arrangement there will be substantially no inductive effect produced in the winding 7 due to the sudden increase in the current in the conductor 10 upon the occurrence of a short circuit because of the position of this conductor and by reason of the air gap 14.

The operation of the arrangement shown in simplified diagram in Fig. 2 is substantially the same as that shown in Fig. 1, with the exception that in Fig. 2 the inductive shunt 16 around the conductor 10 is provided for accelerating the increase in current through the conductor, as heretofore explained, and the blowout coil 20 has in this figure been located in the main circuit of the generator and not in the shunt circuit around the resistance 3 which includes the contacts 11 and 12. The effectiveness of this blowout coil is increased by this arrangement because the blowout flux does not reduce as rapidly as the current through the contacts owing to the current shunted through resistance *r*, and a substantial amount of inductance is removed from the circuit including the conductor 10. It is considered unnecessary to give in detail the operation of this arrangement since it will be readily understood from the description of the operation of Fig. 1. The interrupter will be more quickly responsive to sudden changes in current value than the arrangement shown in Fig. 1, due to the inductive shunt 16 and somewhat to the fact that the circuit including the conductor 10 is less inductive. The closing winding 16′ is energized to close the switch through the relay 21 which in turn is energized by pressing the push button 22, providing the switch is open so that the contacts 23 are bridged by the member 24 which is operated by the switch member 3.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is—

1. An interrupter for electric circuits, comprising a switch member biased to open position, an electromagnet for holding the same in closed position, and means whereby upon a change in the condition of said circuit from normal, the holding effect of the flux of said magnet is decreased without materially affecting its density to permit the switch member to interrupt the electric circuit.

2. An interrupter for electric circuits, comprising a switch member biased to open position, an electromagnet for holding the same in closed position, and means whereby upon an increase in current in the circuit above a predetermined value, the holding effect of the flux of said magnet is decreased without materially affecting its density to permit the switch member to interrupt the electric circuit.

3. An interrupter for electric circuits, comprising a switch member biased to the open position, a magnet and an armature cooperating therewith for holding the switch member in the closed position, and means responsive to predetermined conditions in the electric circuit for deflecting the magnetic flux of said holding magnet from the armature so as to decrease the holding effect of the magnet and permit the switch member to interrupt the electric circuit.

4. An interrupter for electric circuits, comprising a switch member biased to the open position, a magnet for holding the switch member in the closed position, and means responsive to predetermined conditions in the electric circuit for changing the path of the magnetic flux through the magnet without materially changing the density of said flux so as to decrease the holding effect of the magnet on the switch member and permit the switch member to interrupt the electric circuit.

5. An interrupter for electric circuits, comprising a switch member biased to the open position, a magnet for holding the switch member in the closed position, and means responsive to abnormal circuit conditions for rendering a portion of the magnetic flux of said magnet ineffective to hold the switch member in the closed position without materially changing in value the total flux of the magnet, thereby permitting the switch member to move quickly to the open position in accordance with its bias.

6. An interrupter for electric circuits, comprising a switch member biased to the open position, a magnet having an armature for holding the switch member in the closed position, and means responsive to predetermined conditions in the electric circuit for shunting from the said armature a portion of the magnetic flux of the magnet without materially chaging the flux density in the main portion of the magnet, thereby decreasing the holding effect on the armature and permitting the switch member to quickly interrupt the electric circuit in accordance with its bias.

7. An interrupter for electric circuits, comprising a switch member biased to the open position, an electromagnet having an armature for holding the switch member in the closed position, and means responsive to a predetermined value of current in the electric circuit located adjacent to the said armature and remotely from the winding of said electromagnet for deflecting the magnetic flux of the electromagnet from said armature so as to substantially demagnetize the said armature and permit the switch member to interrupt the electric circuit in accordance with its bias.

8. An interrupter for electric circuits, comprising a switch member biased to the open position, an electromagnet having an armature adapted to bridge the poles of the magnet and hold the switch member in the closed position, and means located in the air gap between the said poles for deflecting the magnetic flux from the said armature so as to substantially demagnetize the armature and permit the switch member to open the electric circuit in accordance with its bias.

9. An interrupter for electric circuits, comprising a switch member biased to the open position, an electromagnet having a winding located remotely from the poles of the magnet, an armature adapted to bridge the said magnet poles and hold the switch member in the closed position, and means responsive to a predetermined value of current in the electric circuit located adjacent the said armature for deflecting the magnetic flux set up by the electromagnet away from the armature and through the air gap between the magnet poles so as to substantially demagnetize the armature without materially changing the density of the flux in the main portion of the magnet and permit the switch member to quickly interrupt the electric circuit in accordance with its bias.

10. An interrupter for electric circuits, comprising a switch member biased to the open position, an electromagnet having an armature for holding the switch member in the closed position, the said armature normally held in contact with the poles of the electromagnet by the flux set up by the winding of the electromagnet, and means responsive to a predetermined value of current in the electric circuit for effecting a quick interruption of the electric circuit, the said means so located that the magnetomotive force set up thereby will demagnetize the said armature without materially changing the total flux set up by the winding of the electromagnet.

11. An interrupter for electric circuits, comprising a switch member biased to the open position, an electromagnet having a winding located remotely from the poles of the magnet, an armature for holding the switch member in the closed position, the said armature normally held in contact with the said poles by the flux set up by the winding of the electromagnet, and means disposed between the said poles responsive to a predetermined value of current in the electric circuit for demagnetizing the said armature without materially changing in value the total flux set up by the said winding so as to permit the switch member to move quickly to the open position in accordance with its bias.

12. An interrupter for electric circuits, comprising a switch member biased to the open position, an electromagnet having a winding and an air gap in the path of the flux set up by the winding disposed between the winding and one of the poles of the electromagnet, an armature for holding the switch member in the closed position, the said armature normally held in contact with the poles of the electromagnet by the flux set up by the said winding, and means disposed between the said poles responsive to a predetermined value of current in the electric circuit for demagnetizing the said armature without materially changing in value the total flux set up by the said winding so as to permit the switch member to move quickly to the open position in accordance with its bias.

13. An interrupter for electric circuits, comprising a switch member biased to the open position, an electromagnet having an armature for holding the switch member in the closed position, the said armature normally held in contact with the poles of the electromagnet by the flux set up by the winding of the electromagnet, and means for effecting a quick interruption of the electric circuit responsively to the current in the electric circuit, comprising a straight conductor disposed between the poles of the electromagnet adjacent to the said armature for setting up a magnetomotive force to demagnetize the said armature without materially changing in value the flux set up by the winding of the electromagnet.

14. A quick acting interrupter for electric circuits comprising a switch member biased to the open position, a magnet having an armature for holding the switch member in the closed position, and means responsive to the value and to the rate of increase of the current in the circuit controlled by the switch for shunting from the said armature the holding flux of the said magnet whereby the switch is permitted to open at values of current in the controlled circuit dependent upon the rate of increase of the said current.

15. An interrupter for electric circuits comprising a switch member biased to the open position, a magnet for holding the switch member in the closed position, and means responsive to the current in the controlled circuit for deflecting the magnetic flux of the said holding magnet to release the switch member at one value of current under normal overload conditions and at a materially smaller value of current under short circuit conditions.

16. An interrupter for electric circuits comprising a switch member biased to the open position, an electromagnet having an armature for holding the switch member in the closed position, and means energized responsively to the value and to the rate of increase of the current in the circuit controlled by the switch for deflecting the magnetic flux of the said holding electromagnet from the said armature to release the holding effect of the said electromagnet at one value of current in the controlled circuit when the rate of increase of the current is substantially normal and at a lesser value of current when the rate of increase of the current is abnormally high.

17. An interrupter for electric circuits comprising a switch member biased to the open position, an electromagnet having an armature for holding the switch member in the closed position, means responsive to the current in the circuit controlled by the switch located adjacent to the said armature and remotely from the winding of the said electromagnet for deflecting the magnetic flux of the electromagnet from said armature so as to substantially demagnetize the said armature and permit switch member to interrupt the electric circuit in accordance with its bias and an inductive shunt around the said means for varying the effect of the said means responsively to the rate of increase of the current whereby the switch is opened at a different value of current than the said predetermined value when the rate of increase of the current is abnormal.

18. An interrupter for electric circuits comprising a switch member biased to the open position, an electromagnet for holding the same in closed position, means whereby upon an increase in the current in the controlled circuit above a predetermined value the holding effect of the flux of said magnet is decreased without materially effecting the density thereof to permit the switch member to interrupt the electric circuit in accordance with its bias, and means cooperating with the first mentioned means for varying the effect thereof responsively to the rate of increase of the said current, whereby the switch member is permitted to interrupt the electric circuit at the said predetermined value when the rate of increase of the said current is substantially normal and is permitted to interrupt the electric circuit at a substantially different value of current when the rate of increase of the said current is abnormal.

19. A quick acting interrupter for electric circuits comprising an electric switch biased to the open position, an electromagnet for holding the switch in the closed position, means responsive to the current in the controlled circuit for releasing the holding effect of the said electromagnet at a predetermined value of current in the controlled circuit, and an inductive shunt around the said means for causing the current in the said means to increase at a greater rate than the rate of increase of the current in the controlled circuit, whereby when the rate of increase of the current in the controlled circuit is abnormally high the holding effect of the said electromagnet is released before the current in the controlled circuit has reached the predetermined value.

20. An interrupter for electric circuits, comprising a switch member biased to the open position, an electromagnet having an armature for holding the switch member in the closed position, the said armature normally held in contact with the poles of the electromagnet by the flux set up by the winding of the electromagnet, and means for effecting a quick interruption of the electric circuit responsively to the current in the electric circuit, comprising a straight conductor and an inductive shunt therefor, the said conductor being disposed between the poles of the electromagnet adjacent the said armature so as to set up a magnetomotive force to demagnetize the said armature without materially changing in value the flux set up by the winding of the electromagnet.

21. An interrupter for electric circuits, comprising two biased cooperating circuit making movable contacts, one of the contacts having a greater moment of inertia than the other, and means responsive to a predetermined value of current in the electric circuit for opening the electric circuit quickly due to the bias of one of the contacts and the inertia effect of the other.

22. An interrupter for electric circuits, comprising a pair of movable cooperating wiping contacts, the first of the contacts having a greater moment of inertia than the second, means for biasing the first contact toward the second, means for biasing the second contact away from the first, means for holding the said contacts in engagement, and means responsive to a predetermined value of current through the contacts for effecting a quick separation of the contacts due to the bias of the second contact and the inertia effect of the first.

23. An interrupter for electric circuits, comprising a movable switch member biased to the open position, a movable contact member having a greater moment of inertia adapted to be engaged by the contact of the said switch member, an electromagnet and an armature cooperating therewith for holding the said switch member in the closed position, and means responsive to a predetermined value of current in the electric circuit for effecting a quick interruption of the electric circuit, the said means so located that the magnetomotive force set up thereby will demagnetize the said armature without materially changing in value the total flux set up by the winding of the electromagnet.

24. An interrupter for electric circuits, comprising a movable switch member biased to the open position, a movable contact member having a greater moment of inertia than the switch member biased toward the switch member and adapted to make wiping engagement with the contact of the switch member, an electromagnet having an armature for holding the switch member in the closed position, the said armature normally held in contact with the poles of the electromagnet by the flux set up by the winding of the electromagnet, and means for effecting a quick interruption of the electric circuit responsively to the current in the electric circuit, comprising a straight conductor disposed between the poles of the electromagnet adjacent to the said armature for setting up a magnetomotive force to demagnetize the said armature without materially changing in value the flux set up by the winding of the electromagnet.

In witness whereof, I have hereunto set my hand this 8th day of July, 1921.

JOHN F. TRITLE.